(12) United States Patent
Uppuluri

(10) Patent No.: US 12,090,396 B2
(45) Date of Patent: Sep. 17, 2024

(54) HAPTICS SUPPORT FOR UI NAVIGATION

(71) Applicant: Sony Interactive Entertainment Inc., Tokyo (JP)

(72) Inventor: Satish Uppuluri, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 223 days.

(21) Appl. No.: 17/817,229

(22) Filed: Aug. 3, 2022

(65) Prior Publication Data
US 2024/0042312 A1 Feb. 8, 2024

(51) Int. Cl.
*A63F 13/285* (2014.01)
*A63F 13/426* (2014.01)
*G06F 3/01* (2006.01)
*G06F 3/04812* (2022.01)

(52) U.S. Cl.
CPC .......... *A63F 13/285* (2014.09); *A63F 13/426* (2014.09); *G06F 3/016* (2013.01); *G06F 3/04812* (2013.01); *A63F 2300/1037* (2013.01)

(58) Field of Classification Search
None
See application file for complete search history.

(56) References Cited

U.S. PATENT DOCUMENTS

2010/0267424 A1* 10/2010 Kim ..................... G06F 3/04883
345/173
2011/0260996 A1* 10/2011 Henricson ............... G06F 3/041
345/173
2014/0139450 A1* 5/2014 Levesque .............. G06F 1/1692
345/173
2015/0277559 A1 10/2015 Vescovi et al.
2020/0064141 A1* 2/2020 Bell ...................... G09B 21/006

OTHER PUBLICATIONS

"International Search Report and Written Opinion", dated Nov. 28, 2023, from the counterpart PCT application PCT/US23/71295.
F. Zotter, M. Frank, Ambisonic decoding with panning-invariant loudness on small layouts (AllRAD2), in 144th AES Convention, prepr. 9943 (Milano, 2018).
Gorzel, M, Allen, A, et. al. Efficient Encoding and Decoding of Binaural Sound with Resonance Audio. AES Conference on immersive and interactive Audio, York, UK, Mar. 27-29, 2019.
Zotter, Franz & Frank, Matthias. (2012). All-Round Ambisonic Panning and Decoding—Abstract. Journal of the Audio Engineering Society. 60. https://www.semanticscholar.org/paper/All-Round-Ambisonic-Panning-and-Decoding-Zotter-Frank/33659c7767b9a44fe392ddb91dab8ec429b81b02.

* cited by examiner

*Primary Examiner* — Jason T Yen
(74) *Attorney, Agent, or Firm* — John L. Rogitz; John M. Rogitz

(57) ABSTRACT

Haptic support for UI navigation is provided so that in addition to visual cues such as a cursor moving onscreen and audio cues such as sound effects, tactile feedback is provided through haptic generators in an input device such as a computer simulation controller. As the cursor moves right, for example, a haptic generator on the right side of the controller may be activated to generate a tactile sensation on the right side of the controller, and vice versa.

18 Claims, 13 Drawing Sheets

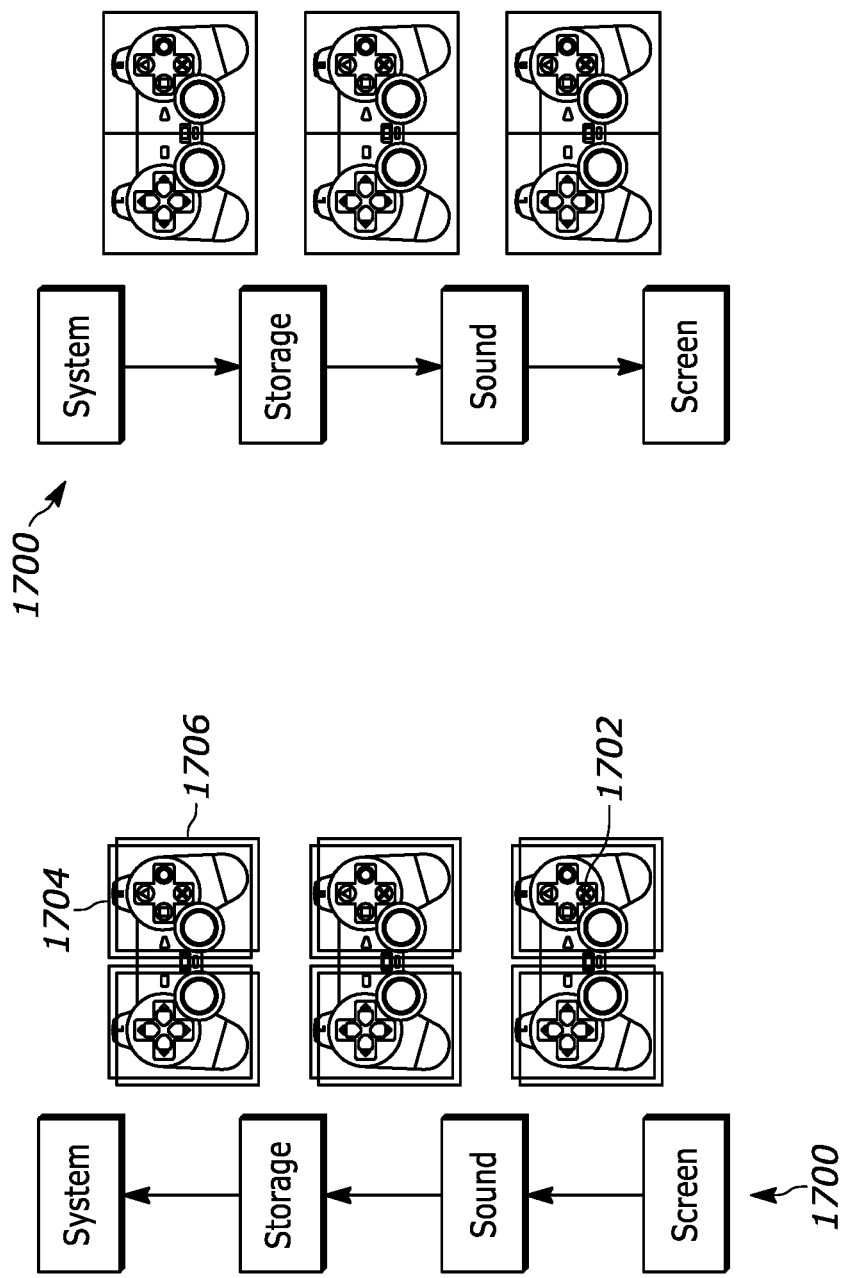

HAPTICS SUPPORT FOR UI NAVIGATION

FIELD

The present application relates generally to haptic support for user interface (UI) navigation.

BACKGROUND

Computer input devices such as computer simulation controllers such as computer game controllers can be used to navigate user interfaces (UI) by moving "focus" around the UI by moving a cursor. The cursor is a visible cue as to where the focus is and where it is going. Audible cues such as sound effects also may be used to indicate audibly where the focus is and where it is going.

SUMMARY

As understood herein, adding tactile cues to UI navigation can enhance the experience of many users.

Accordingly, a device includes a housing and at least one navigation element on the housing that is operable to move a focus on at least one user interface (UI) presented on at least one display. Also, at least first and second haptic generators are in the housing. At least one processor is in the housing and is configured with instructions executable to activate at least the first haptic generator responsive to the focus moving in a first direction on the UI, and activate at least the second haptic generator responsive to the focus moving in a second direction on the UI.

In example embodiments the instructions can be executable to, responsive to the focus reaching an end of scroll, activate both the first and second haptic generators.

In some techniques consistent with present principles, the instructions may be executable to activate the first haptic generator but not the second haptic generator responsive to the focus moving in the first direction on the UI, and activate the second haptic generator but not the first haptic generator responsive to the focus moving in the second direction on the UI. In other techniques consistent with present principles, the instructions may be executable to activate the first haptic generator at a first strength and activate the second haptic generator at a second strength responsive to the focus moving in the first direction on the UI, and activate the second haptic generator at the first strength and activate the first haptic generator at the second strength responsive to the focus moving in the second direction on the UI.

In example implementations the instructions may be executable to activate the first haptic generator at a first strength responsive to the focus moving in the first direction and being in a first location, and activate the first haptic generator at a second strength responsive to the focus moving in the first direction and being in a second location.

In some embodiments the instructions may be executable to activate the first and second haptic generators at a first strength responsive to the first direction being up and activate the first and second haptic generators at a second strength responsive to the first direction being down. In other embodiments the instructions can be executable to activate at least the first haptic generator N times responsive to first direction being up, and activate at least the first haptic generator M times responsive to first direction being down, wherein N and M are integers greater than zero.

If desired, the instructions may be executable to activate at least the first haptic generator from a first strength to a second strength responsive to the focus being on a first tab, and activate at least the first haptic generator from the second strength to the first strength responsive to the focus being on a second tab.

In another aspect, a method includes identifying at least one focus on at least one user interface (UI) presented on at least one display. The method also includes activating at least a first haptic generator in at least one input device responsive to the focus moving in a first direction on the UI, and activating at least a second haptic generator in the input device responsive to the focus moving in a second direction on the UI.

In another aspect, an assembly includes at least one computer game controller configured to input navigation signals for moving at least one focus on at least one user interface on at least one display. The apparatus further includes at least first and second haptic generators in the computer game controller. Circuitry is provided and configured for identifying at least one aspect of the focus, and responsive to the aspect, activating at least one of the haptic generators.

The details of the present application, both as to its structure and operation, can be best understood in reference to the accompanying drawings, in which like reference numerals refer to like parts, and in which:

BRIEF DESCRIPTION OF THE DRAWINGS

FIG. 17 schematically illustrates aspects of FIG. 16 as focus moves in the UI;

FIG. 18 schematically illustrates aspects of FIG. 16 as focus moves in the UI.

DETAILED DESCRIPTION

Figure 1:
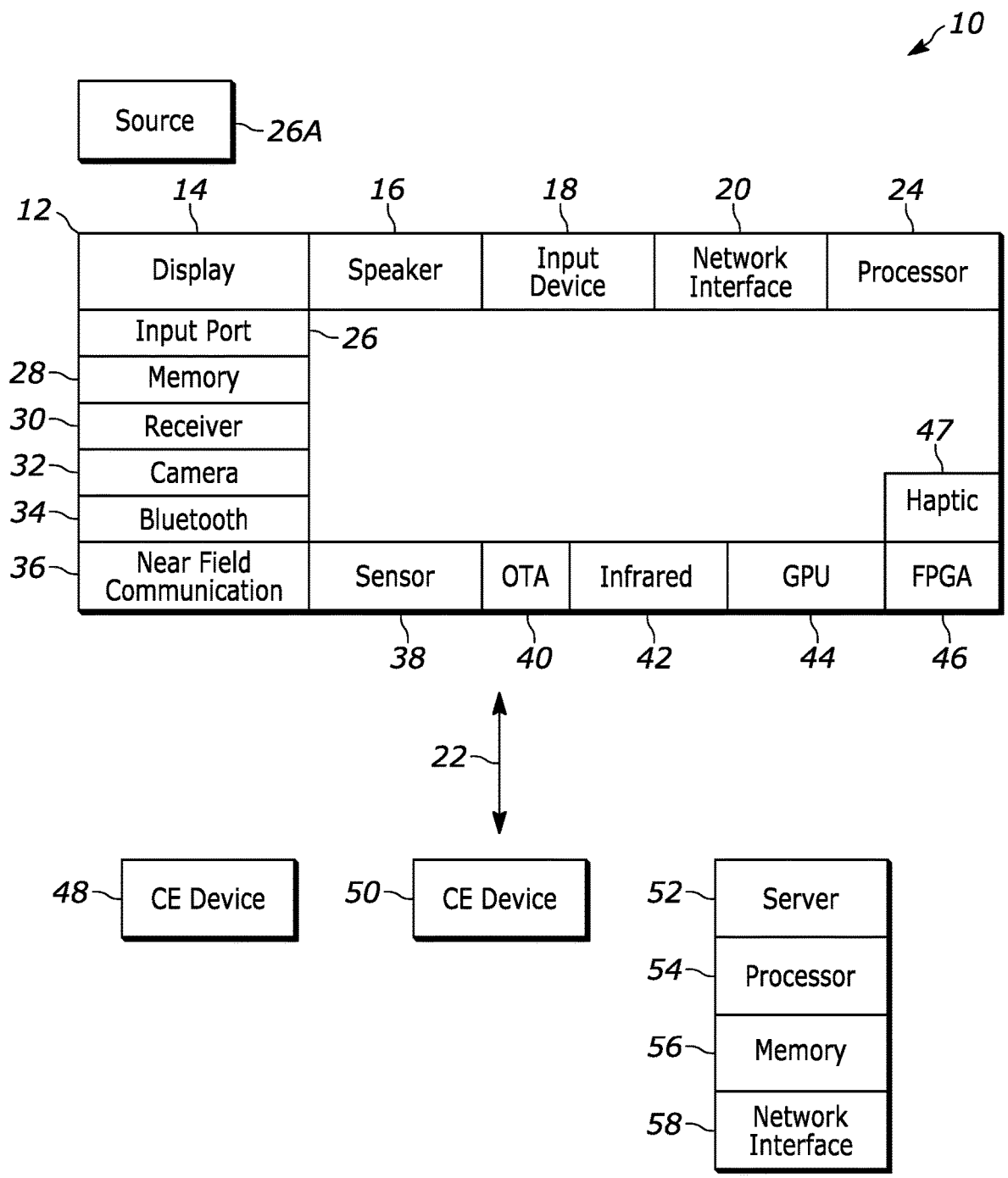
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"At least one of A, B, and C" (likewise "at least one of A, B, or C" and "at least one of A, B, C") includes A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1.

Figure 2:
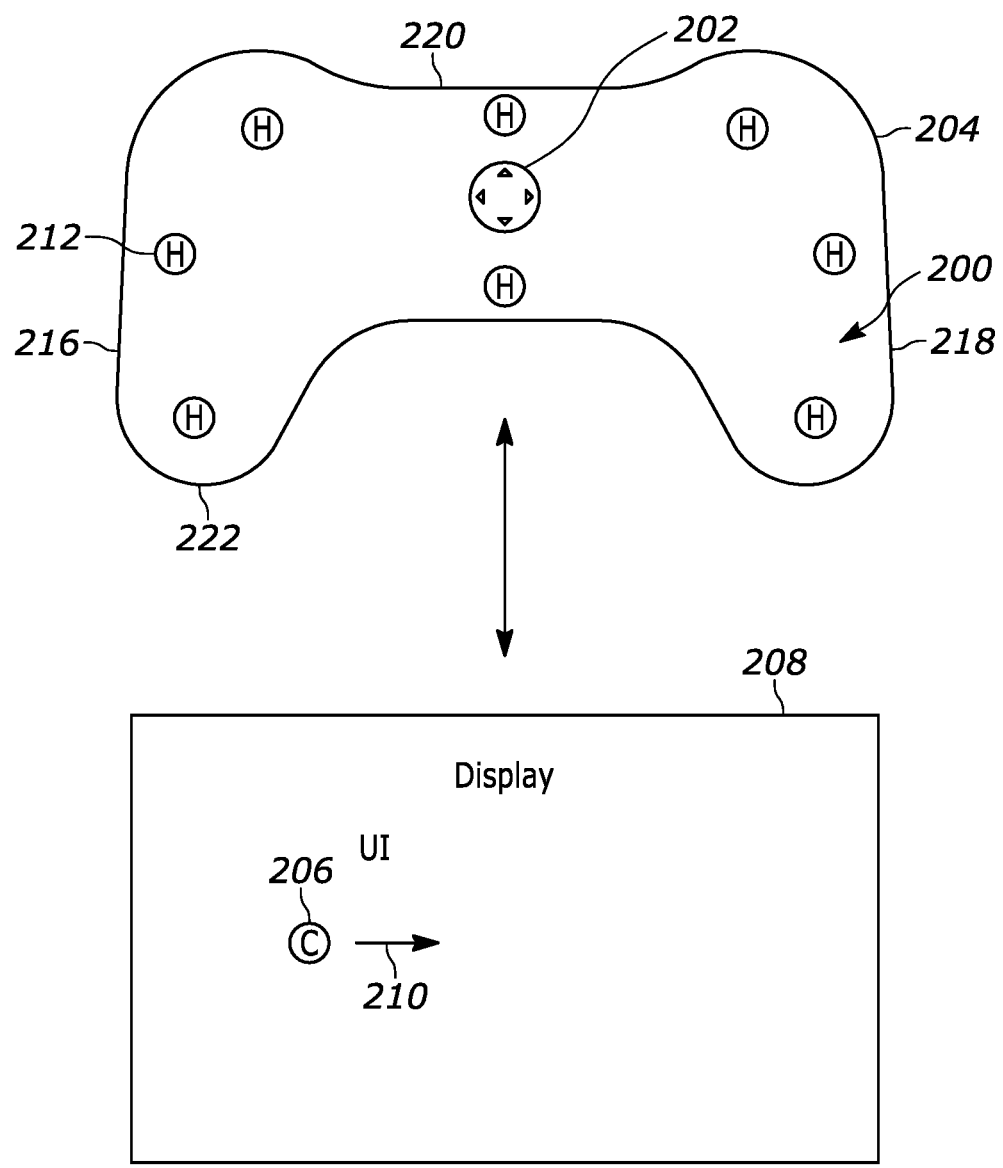
FIG. 2 schematically illustrates an example input device configured as a computer simulation controller communicating with a display to navigate a UI.

FIG. 2 shows an input device 200 configured as a computer game controller. The input device 200 has at least one navigation element 202 on a housing 204, in this case, an up/down/left/right rocker manipulable to move a UI cursor 206 on a display 208 as indicated by the right arrow 210. The display and input device may communicate via wired or wireless link such as any of the links described herein. The navigation element 202 shown in FIG. 2 is but one example of navigation elements that may be used. Other examples of manipulable navigation elements include buttons, joystick-like devices, other point-and-click devices, and touch pads. Examples of non-manipulable navigation elements include microphones feeding voice navigation commands to a speech recognition engine and a camera feeding images of navigation gestures made in free space to a gesture recognition engine or eye tracking images to a gaze tracking model to correlate a direction of gaze to a desired navigation direction.

As shown in FIG. 2, the input device 200 also includes one and in the example shown plural haptic generators 212 that may be activated to produce tactile sensation in a person holding the input device. In some examples a haptic generator may be operated at various strength levels to produce correspondingly various tactile sensations, e.g., weak, medium, and strong.

In the non-limiting example shown, one or more haptic generators are disposed on a left side 214 of the housing 204, one or more haptic generators are disposed on a right side 216 of the housing 204, one or more haptic generators are disposed near a front 218 of the housing 204, and one or more haptic generators are disposed near a rear 222 of the housing 204. The input device 200 may include additional components shown and described in reference to FIG. 1 including, e.g., processors, communication interfaces, and computer storage. Likewise, the display 200 may incorporate any or all of the components of the AVDD 12 shown in FIG. 1.

Figure 3:
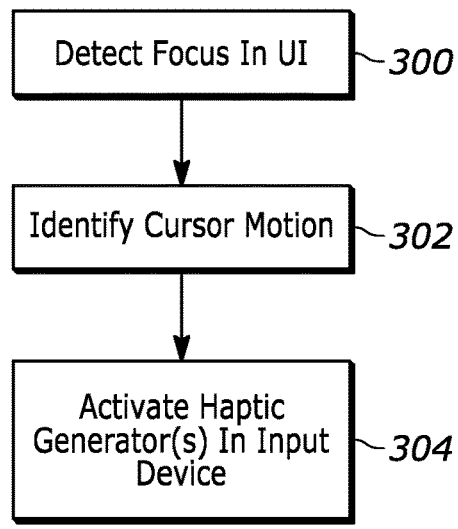
FIG. 3 illustrates example overall logic in example flow chart format.

FIG. 3 illustrates overall logic consistent with present principles. The logic may be undertaken by any one or more of the processors described herein. Commencing at block 300, focus is detected in a UI presented on a display such as any display herein. Typically, focus is defined by the location of the cursor of the display as controlled by any of the navigation elements described herein. Cursor (and hence focus) motion is identified at block 302, and in response to the direction of motion one or more haptic generators are activated at block 304.

By way of non-limiting example, signals from the navigation element of the input device may be provided to a processor in the input device, which correlates the signals to haptic generator activation consistent with disclosure herein. Or, the display may communicate cursor motion location, speed, and direction to the processor in the input device for correlation thereof to haptic generator activation.

Figure 4:
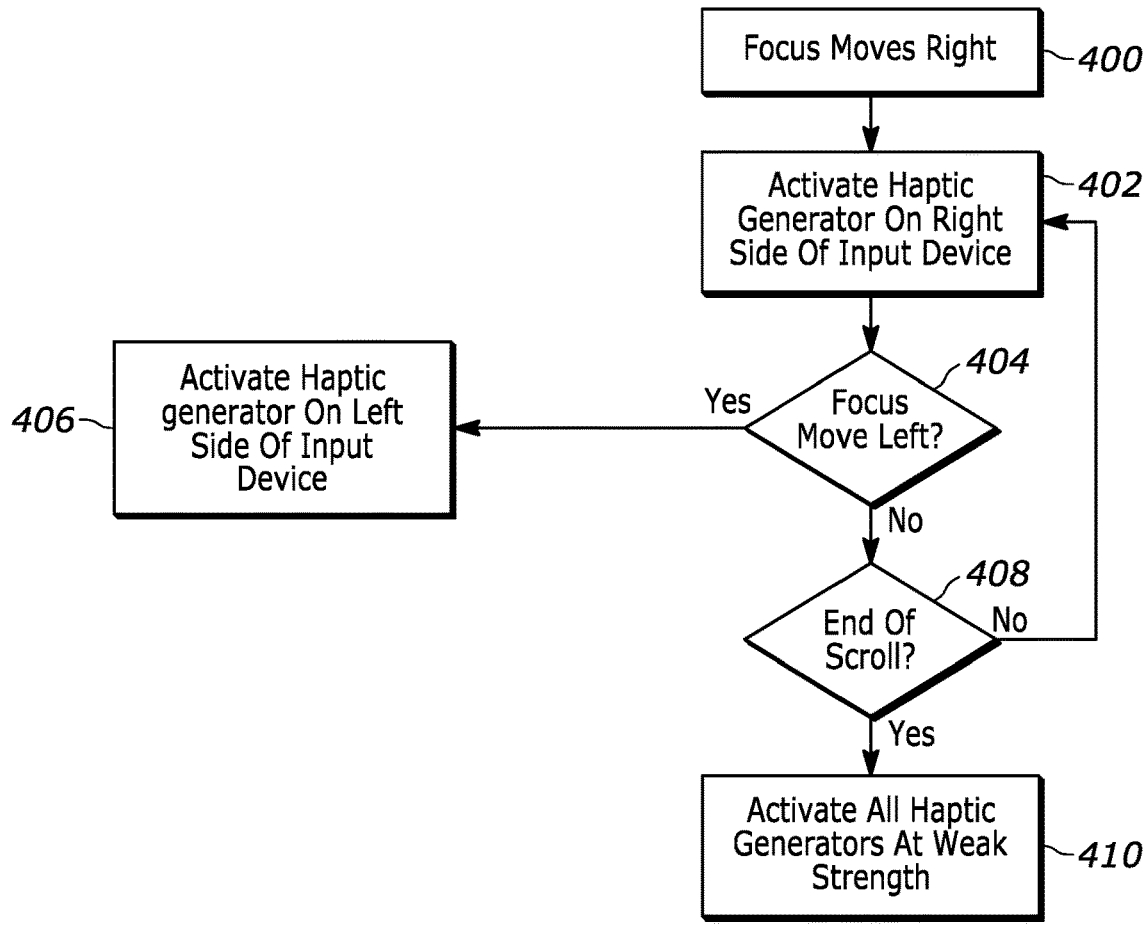
FIG. 4 illustrates example specific logic in example flow chart format for linking haptic feedback to focus.

Refer to FIG. 4 for a first specific example. Commencing at block 400, it is assumed that the focus is moving right on the display responsive to input from the navigation element of the input device. In response to the rightward motion of the cursor, at block 402 a haptic generator is activated on the right side of the input device. Decision diamond 404 indicates that should operation of the navigation element move the focus back to the left, a haptic generator is activated on the left side of the input device at block 406.

Still further, decision diamond 408 indicates that should operation of the navigation element result in the cursor being at the end of the scroll limit, right or left, all haptic generators in the input device may be activated to block 410 at a low activation strength level.

Figure 5:
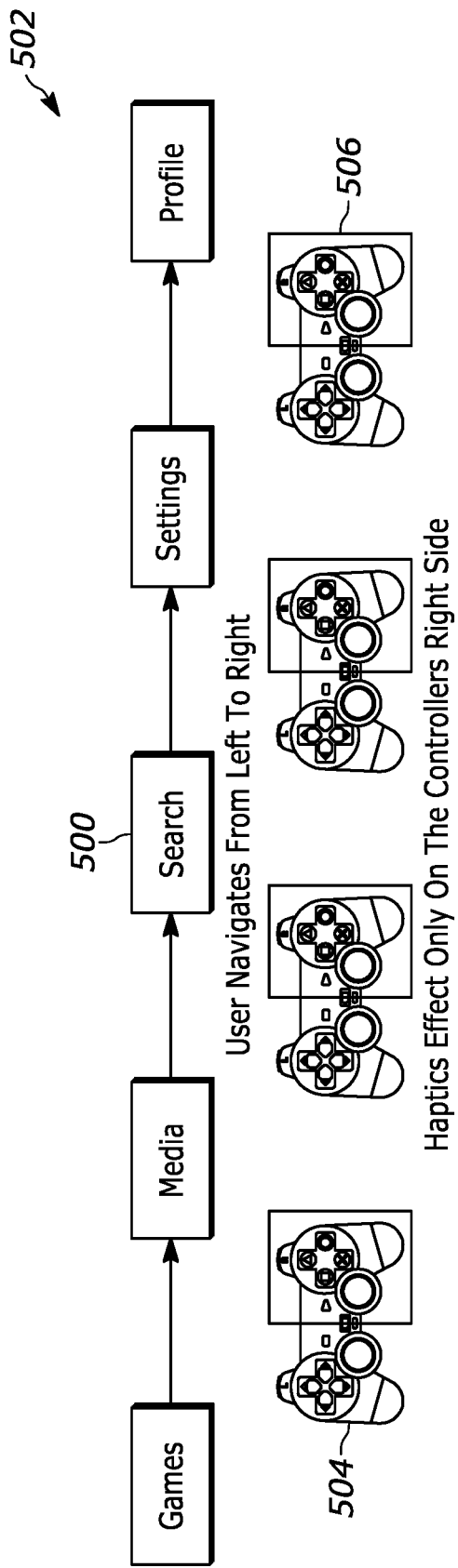
FIG. 5 schematically illustrates aspects of FIG. 4 as focus moves in the UI.
Figure 6:
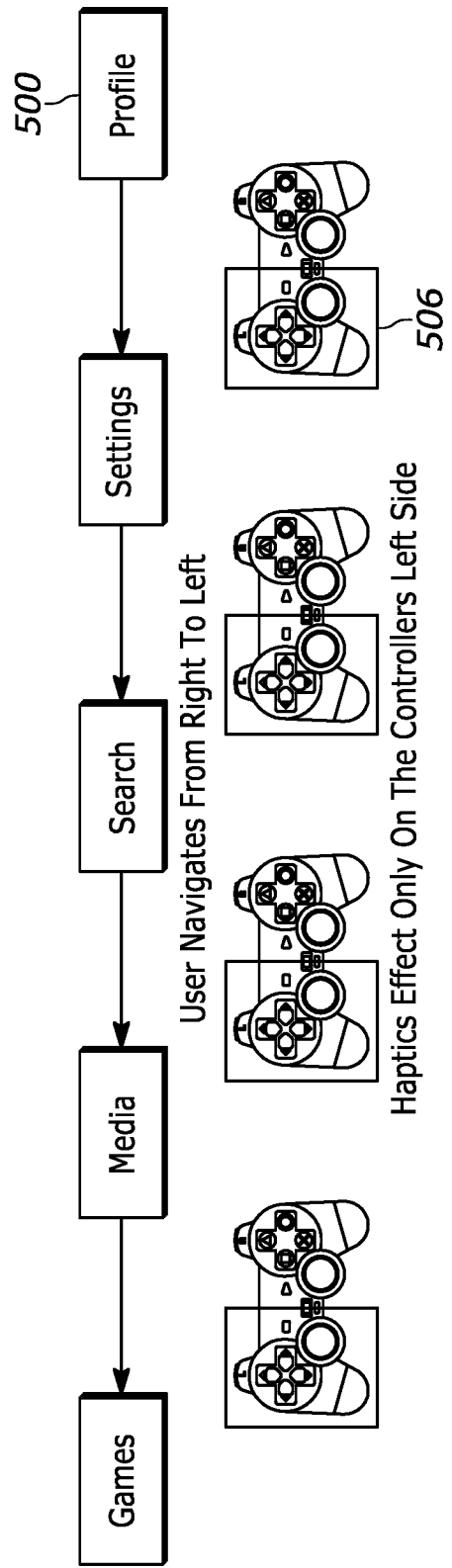
FIG. 6 schematically illustrates aspects of FIG. 4 as focus moves in the UI.

FIGS. 5 and 6 schematically illustrate the technique of FIG. 4. In FIG. 5, focus successively moves to the right across selectors 500 of a UI 502 owing to operation (such as manipulation) of a navigation element on an input device 504 configured as computer game controller. The example selectors 500 progress from "games" to "media" to "search" to "settings" to "profile" as shown. As the focus moves right, at least one haptic generator is activated on the right side of the input device 504 as indicated by the shaded boxes 506 in FIG. 5.

In FIG. 6, focus successively moves to the left across the selectors 500 owing to operation (such as manipulation) of a navigation element on the input device 504. As the focus moves left, at least one haptic generator is activated on the left side of the input device 504 as indicated by the shaded boxes 508 in FIG. 6.

While FIGS. 5 and 6 illustrate focus moving tab-to-tab, it is to be understood that present principles apply to sliders as well.

Figure 7:
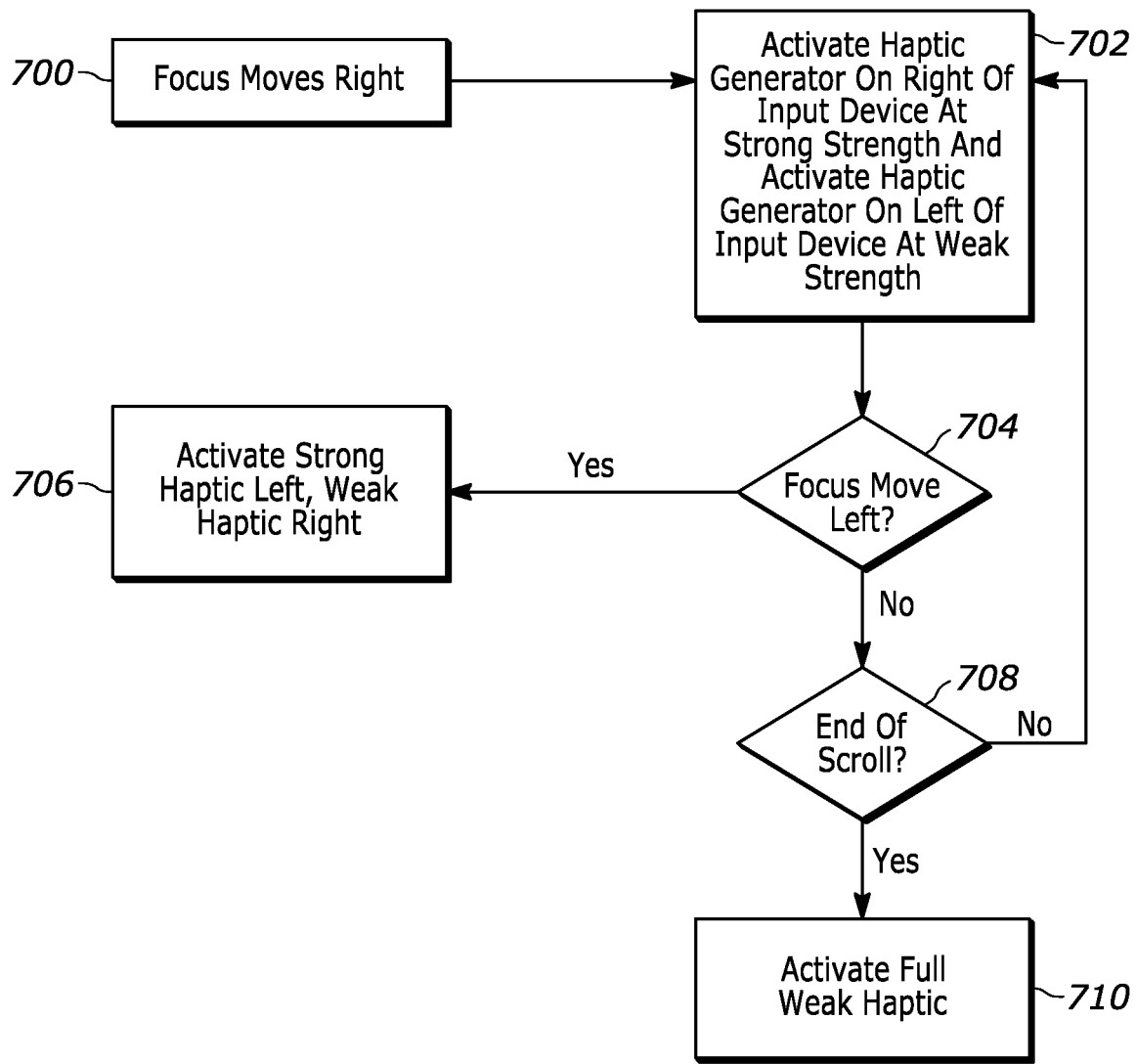
FIG. 7 illustrates further example specific logic in example flow chart format for linking haptic feedback to focus.

Refer now to FIG. 7 for a second specific example. Commencing at block 700, it is assumed that the focus is moving right on the display responsive to input from the navigation element of the input device. In response to the rightward motion of the cursor, at block 702 a haptic generator is activated on the right side of the input device at a first strength, while a haptic generator is activated on the left side of the input device at a second strength. In one example the first strength is stronger than the second strength. Decision diamond 704 indicates that should operation of the navigation element move the focus back to the left, a haptic generator is activated on the left side of the input device at block 706 at a first strength, while a haptic generator is activated on the left side of the input device at a second strength. In one example the first strength is stronger than the second strength.

Still further, decision diamond 708 indicates that should operation of the navigation element result in the cursor being at the end of the scroll limit, right or left, all haptic generators in the input device may be activated to block 710 at a low activation strength level.

Figure 8:
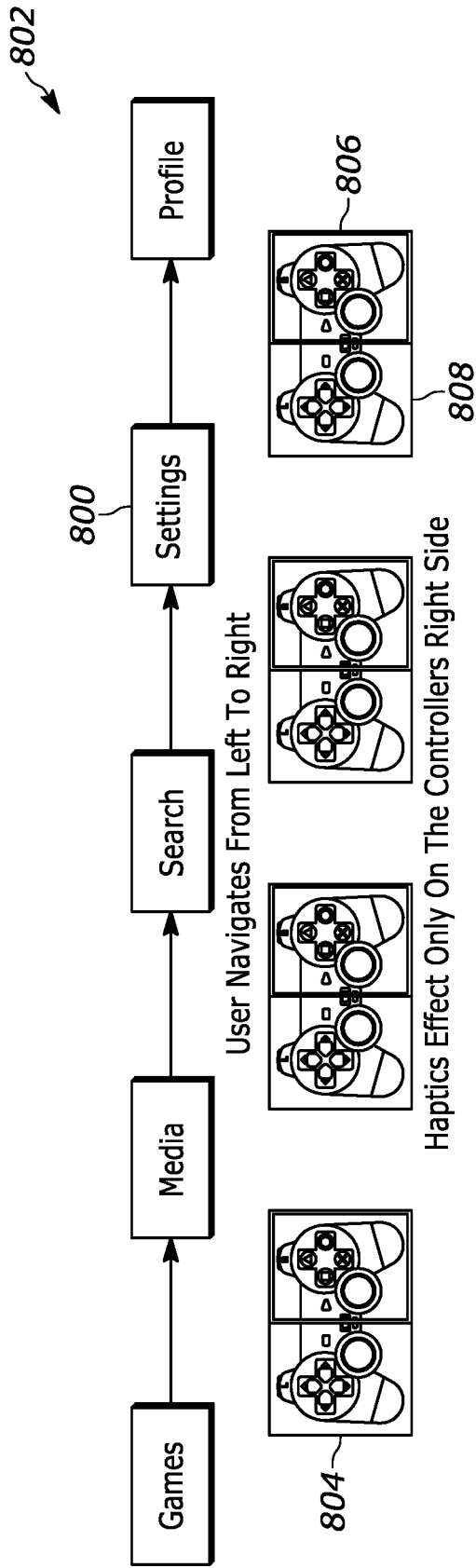
FIG. 8 schematically illustrates aspects of FIG. 7 as focus moves in the UI.
Figure 9:
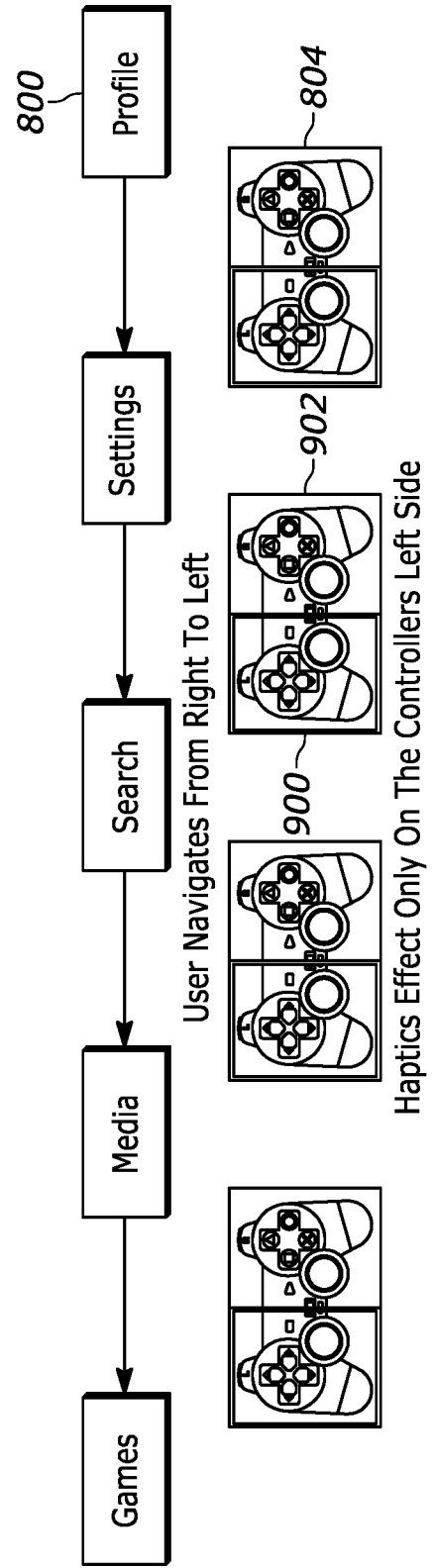
FIG. 9 schematically illustrates aspects of FIG. 7 as focus moves in the UI.

FIGS. 8 and 9 schematically illustrate the technique of FIG. 7. In FIG. 8, focus successively moves to the right across selectors 800 of a UI 802 owing to operation (such as manipulation) of a navigation element on an input device 804 configured as computer game controller. The example selectors 800 progress from "games" to "media" to "search" to "settings" to "profile" as shown. As the focus moves right, at least one haptic generator is activated on the right side of the input device 804 at strong strength to produce a strong tactile sensation as indicated by the bold outline boxes 806 on the right side of the input device in FIG. 8. The weak outline boxes 808 in FIG. 8 on the left side of the input device indicates that at least one haptic generator is activated on the left side of the input device at a weak strength to produce a weaker tactile sensation than produced on the right side.

In FIG. 9, focus successively moves to the left across the selectors 800 owing to operation (such as manipulation) of a navigation element on the input device 804. As the focus moves left, at least one haptic generator is activated on the left side of the input device 804 at strong strength to produce a strong tactile sensation as indicated by the bold outline boxes 900 on the left side of the input device in FIG. 9. The weak outline boxes 902 in FIG. 9 on the right side of the input device indicates that at least one haptic generator is activated on the right side of the input device at a weak strength to produce a weaker tactile sensation than produced on the left side.

Figure 10:
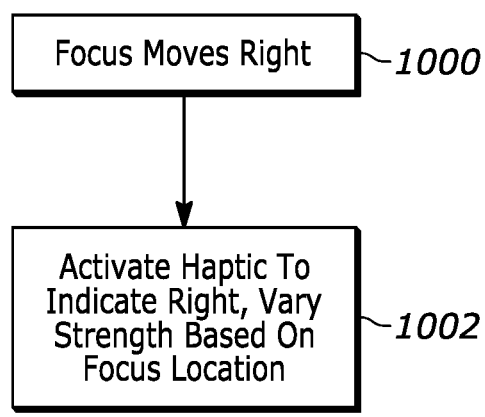
FIG. 10 illustrates further example specific logic in example flow chart format for linking haptic feedback to focus.

FIG. 10 illustrates a still further specific example. Commencing at block 1000, assume focus moves right on the UI. In response, at block 1002 at least one haptic generator is activated on the right side of the input device but at varying strength based on the location of focus. For example, as the cursor moves right while on the left side of the UI, haptic activation strength may be weak, and may become progressively stronger as focus moves right. Or, as the cursor moves right while on the left side of the UI, haptic activation strength may be strong, and may become progressively weaker as focus moves right. It is to be understood that leftward motion of focus may be indicated by similar activation of at least one haptic generator on the left side of the input device.

Figure 11:
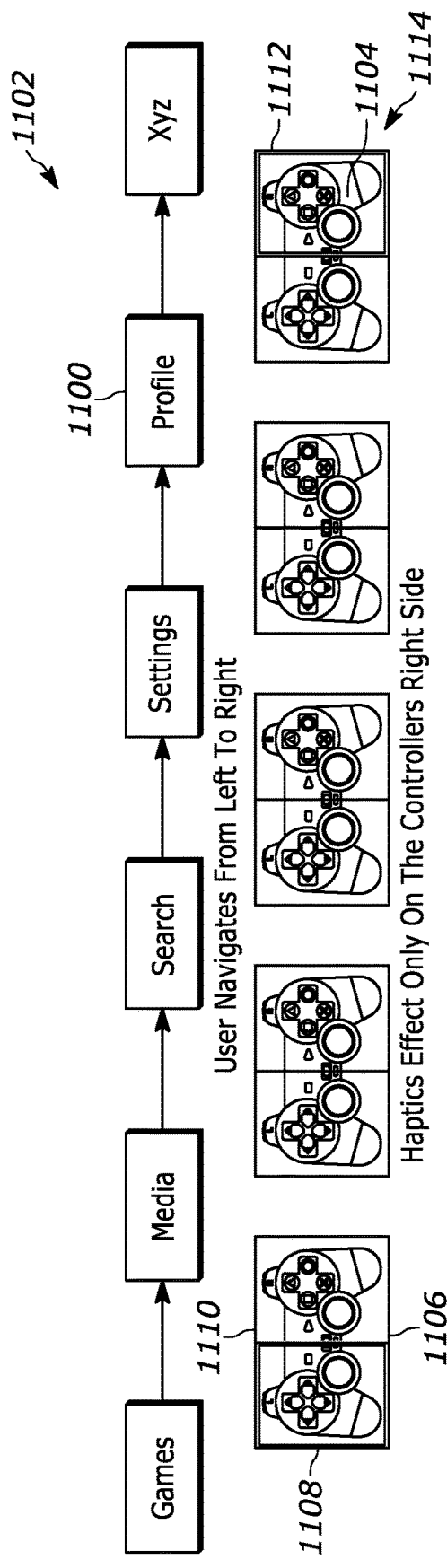
FIG. 11 schematically illustrates aspects of FIG. 10 as focus moves in the UI.
Figure 12:
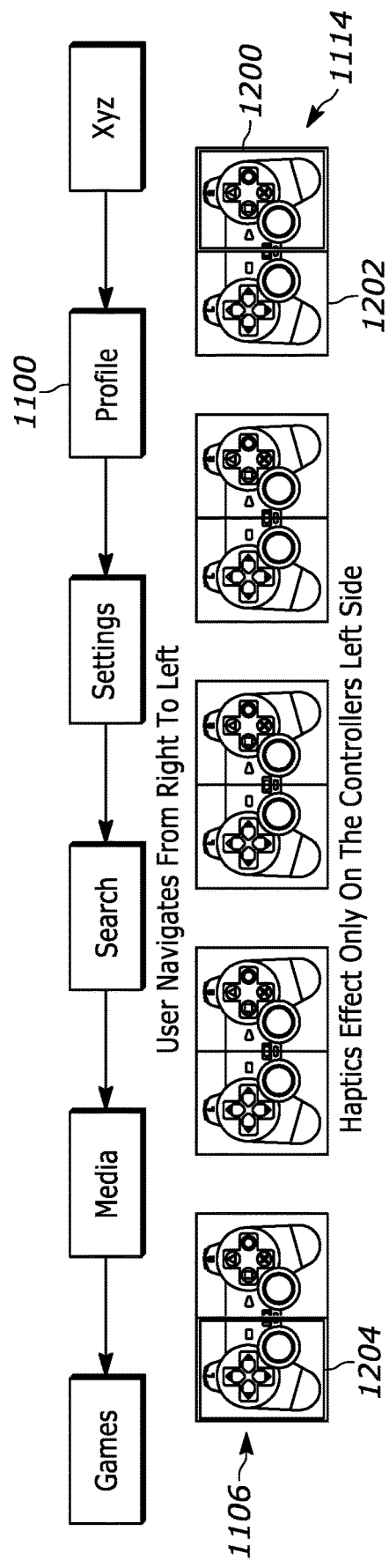
FIG. 12 schematically illustrates aspects of FIG. 10 as focus moves in the UI.

FIGS. 11 and 12 schematically illustrate the technique of FIG. 10. In FIG. 11, focus successively moves to the right across selectors 1100 of a UI 1102 owing to operation (such as manipulation) of a navigation element on an input device 1104 configured as computer game controller. The example selectors 1100 progress from "games" to "media" to "search" to "settings" to "profile" as shown. As the focus moves right, starting from a left-most location 1106 at least one haptic generator may be activated on the left side of the input device as indicated by the bolded box 1108 and at least one haptic generator is activated on the right side of the input device 1104 at a weak strength as indicated by the light outline 1110. However, as focus moves progressively right, the strength of the left haptic element progressively decreases or ceases altogether while the strength of the right haptic element progressively increases to maximum as shown by the right side bolded box 1112 at the right-most scroll limit 1114.

In FIG. 12, focus successively moves to the left across the selectors 1100. As the focus progressively moves left, starting from the right-most location 1114 at least one haptic generator may be activated on the right side of the input device as indicated by the bolded box 1200 and at least one haptic generator is activated on the left side of the input device 1104 at a weak strength as indicated by the light outline 1202. However, as focus moves left, the strength of the right haptic element progressively decreases or ceases altogether while the strength of the left haptic element progressively increases to maximum as shown by the left side bolded box 1204 at the left-most scroll limit 1106.

Figure 13:
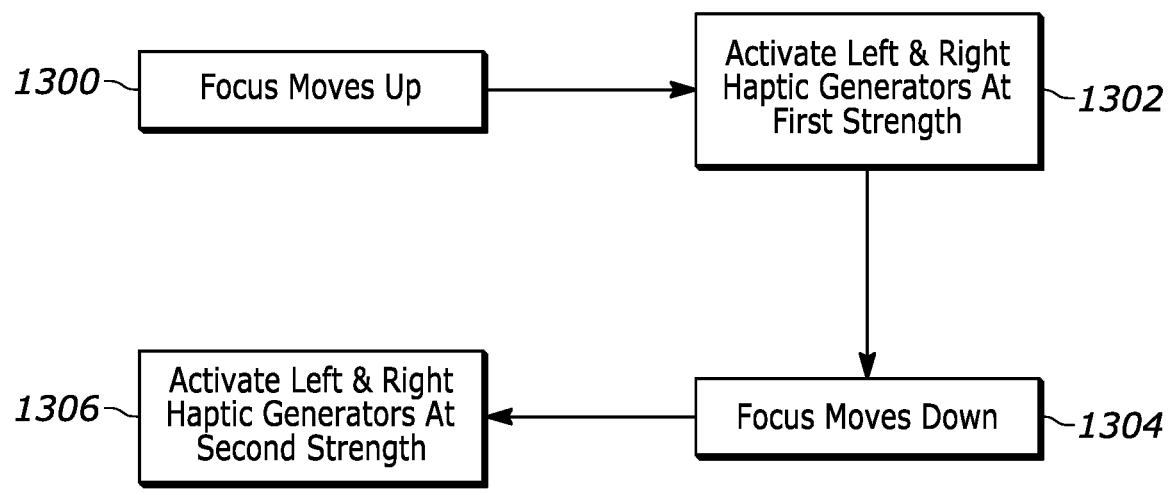
FIG. 13 illustrates further example specific logic in example flow chart format for linking haptic feedback to focus.

FIG. 13 illustrates that present techniques apply to up and down motion of the focus as well as side to side. Thus, at block 1300 assume focus moves up, in response to which at block 1302 left and right haptic generators may be activated at a first strength, whereas when focus moves down at block 1304, at block 1306 left and right haptic generators may be operated at a second, different strength. The second strength may be greater than or lesser to the first strength. Or, as focus moves up, when provided one or more haptic generators may be activated near the front of the input device, while responsive to downward focus motion one or more haptic generators may be activated near the back of the input device.

Figure 15:
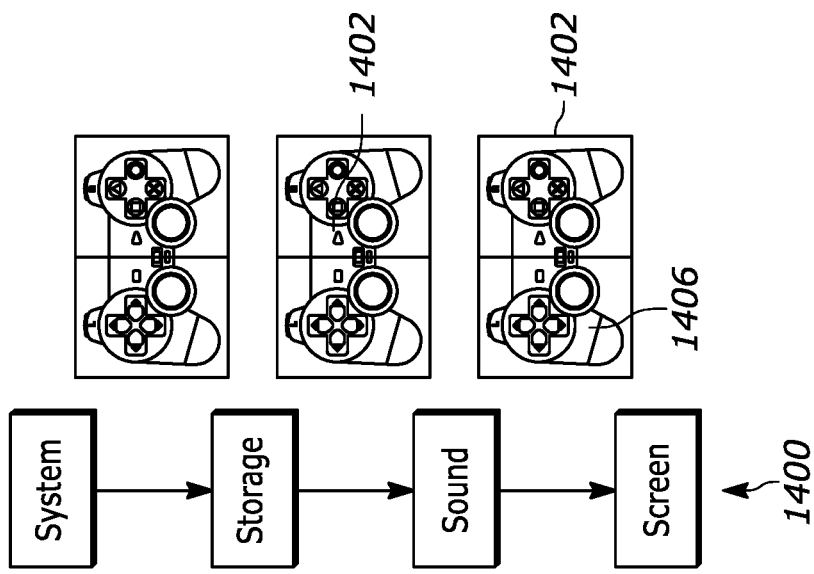
FIG. 15 schematically illustrates aspects of FIG. 13 as focus moves in the UI.
Figure 14:
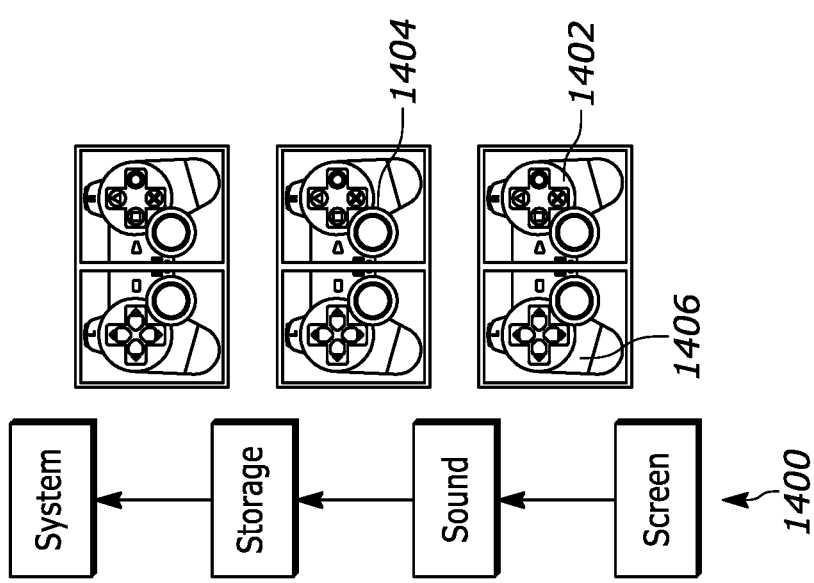
FIG. 14 schematically illustrates aspects of FIG. 13 as focus moves in the UI.

FIGS. 14 and 15 illustrate the technique of FIG. 13. In FIG. 14, focus is moving up across a UI 1400, and in response at least one haptic generator on the right side 1402 of an input device 1404 is activated at a strong strength and at least one haptic generator on the left 1406 of the device is operated at the same strong strength. In contrast, in FIG. 15 focus is moving down across the UI 1400, and in response at least one haptic generator on the right side 1402 of the input device 1404 is activated at a weak strength and at least one haptic generator on the left 1406 of the device is operated at the same weak strength.

Figure 16:
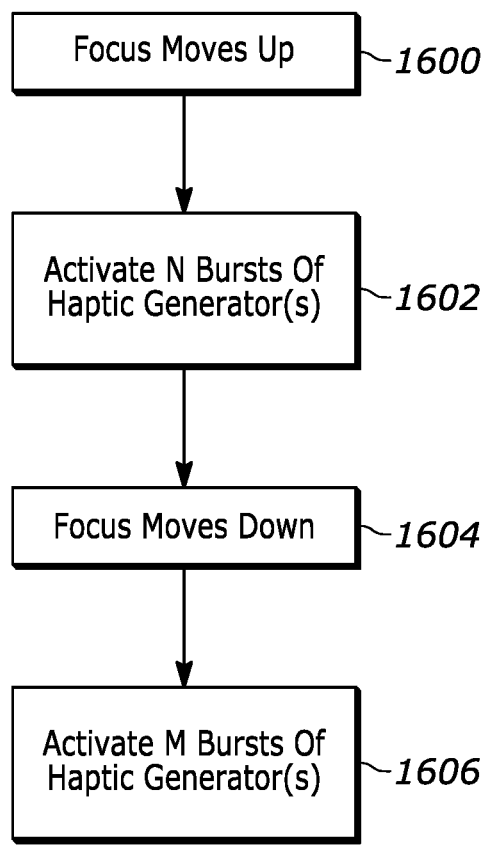
FIG. 16 illustrates further example specific logic in example flow chart format for linking haptic feedback to focus.

FIG. 16 illustrates yet another technique to provide tactile feedback of focus motion, in the example shown, up and down on a UI. Commencing at block 1600, assume focus moves up. In response to that motion of focus, at block 1602 at least one haptic generator in the input device is activated "N" times, e.g., in burst-like fashion. When focus moves down at block 1604, in response at block 1606 at least one haptic generator in the input device is activated "M" times. "N" and "M" are both integers and are not equal to each other.

FIGS. 17 and 18 illustrate an example of the technique of FIG. 16. In FIG. 17, focus on a UI 1700 is moving up, responsive to which at least one haptic generator and in the example left and right haptic generators in an input device 1702 are each activated two times as indicated by the two boxes 1704, 1706. In FIG. 18 on the other hand, focus is moving down, and in response at least one haptic generator and in the example left and right haptic generators in the input device 1702 are each activated once.

Figure 19:
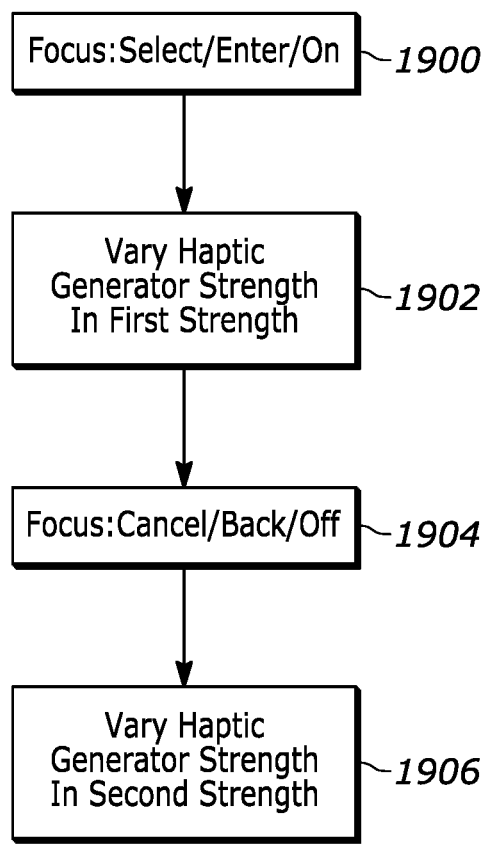
FIG. 19 illustrates a still further example specific logic in example flow chart format for linking haptic feedback to focus.

FIG. 19 illustrates that tactile feedback may be used to differentiate between focus being on one tab or set of tabs and focus being on another tab or set of tabs. For example, when focus is on a "select" or "Enter" or "On" selector element on a UI at block 1900, in response at block 1902 plural haptic generators are activated simultaneously in the input device from weak to strong in a first direction, e.g., left to right (meaning the left haptic generator is activated to produce a weaker tactile feedback than the right haptic generator). In contrast, should focus move to a "cancel" or "back" or "off" selector element on a UI at block 1904, in response at block 1906 plural haptic generators are activated simultaneously in the input device from strong to weak in the first direction.

While the particular embodiments are herein shown and described in detail, it is to be understood that the subject matter which is encompassed by the present invention is limited only by the claims.

What is claimed is:

1. A device, comprising:
    a housing;
    at least one navigation element on the housing operable to move a focus on at least one user interface (UI) presented on at least one display;
    at least first and second haptic generators in the housing; and
    at least one processor in the housing and configured with instructions executable to:
    activate at least the first haptic generator responsive to the focus moving in a first direction on the UI, and activate at least the second haptic generator responsive to the focus moving in a second direction on the UI, wherein the activate at least the first haptic generator and at least the second haptic generator comprises activating at least the first haptic generator N times responsive to first direction being up, and activating at least the first haptic generator M times responsive to first direction being down, wherein N and M are integers greater than zero.

2. The device of claim 1, wherein the instructions are executable to:
    responsive to the focus reaching an end of scroll, activate both the first and second haptic generators.

3. The device of claim 1, wherein the instructions are executable to:
    activate the first haptic generator but not the second haptic generator responsive to the focus moving in the first direction on the UI, and activate the second haptic generator but not the first haptic generator responsive to the focus moving in the second direction on the UI.

4. The device of claim 1, wherein the instructions are executable to:
    activate the first haptic generator at a first strength and activate the second haptic generator at a second strength responsive to the focus moving in the first direction on the UI, and activate the second haptic generator at the first strength and activate the first haptic generator at the second strength responsive to the focus moving in the second direction on the UI.

5. The device of claim 1, wherein the instructions are executable to:
    activate the first haptic generator at a first strength responsive to the focus moving in the first direction and being in a first location, and activate the first haptic generator at a second strength responsive to the focus moving in the first direction and being in a second location.

6. The device of claim 1, wherein the instructions are executable to:
    activate the first and second haptic generators at a first strength responsive to the first direction being up and activate the first and second haptic generators at a second strength responsive to the first direction being down.

7. The device of claim 1, wherein the instructions are executable to:
    activate at least the first haptic generator from a first strength to a second strength responsive to the focus being on a first tab, and activate at least the first haptic generator from the second strength to the first strength responsive to the focus being on a second tab.

8. The device of claim 1, wherein the device comprises a computer game controller.

9. A method, comprising:
    identifying at least one focus on at least one user interface (UI) presented on at least one display;
    activating at least a first haptic generator in at least one input device responsive to the focus moving in a first direction on the UI; and
    activating at least a second haptic generator in the input device responsive to the focus moving in a second direction on the UI;
    wherein the activating the first and second haptic generators comprises activating at least the first haptic generator N times responsive to first direction being up, and activating at least the first haptic generator M times responsive to first direction being down, wherein N and M are integers greater than zero.

10. The method of claim 9, comprising:
responsive to the focus reaching an end of scroll, activating both the first and second haptic generators.

11. The method of claim 9, comprising:
activating the first haptic generator but not the second haptic generator responsive to the focus moving in the first direction on the UI, and activating the second haptic generator but not the first haptic generator responsive to the focus moving in the second direction on the UI.

12. The method of claim 9, comprising:
activating the first haptic generator at a first strength and activating the second haptic generator at a second strength responsive to the focus moving in the first direction on the UI, and activating the second haptic generator at the first strength and activating the first haptic generator at the second strength responsive to the focus moving in the second direction on the UI.

13. The method of claim 9, comprising:
activating the first haptic generator at a first strength responsive to the focus moving in the first direction and being in a first location, and activating the first haptic generator at a second strength responsive to the focus moving in the first direction and being in a second location.

14. The method of claim 9, comprising:
activating the first and second haptic generators at a first strength responsive to the first direction being up and activating the first and second haptic generators at a second strength responsive to the first direction being down.

15. The method of claim 9, comprising:
activating at least the first haptic generator from a first strength to a second strength responsive to the focus being on a first tab, and activating at least the first haptic generator from the second strength to the first strength responsive to the focus being on a second tab.

16. An assembly comprising:
at least one computer game controller configured to input navigation signals for moving at least one focus on at least one user interface on at least one display;
at least first and second haptic generators in the computer game controller; and
circuitry configured for:
identifying at least one aspect of the focus; and
responsive to the aspect, activating at least one of the haptic generators at least in part by activating at least the first haptic generator N times responsive to first direction being up, and activating at least the first haptic generator M times responsive to first direction being down, wherein N and M are integers greater than zero.

17. The assembly of claim 16, wherein the aspect comprises direction of motion.

18. The assembly of claim 16, wherein the aspect comprises location.

* * * * *